US012666262B2

(12) United States Patent
Pai et al.

(10) Patent No.: US 12,666,262 B2
(45) Date of Patent: Jun. 23, 2026

(54) DEVICE, SYSTEM, AND METHOD FOR PROVIDING SERVICES BETWEEN A COMMUNICATION DEVICE AND AN APPLICATION SERVER

(71) Applicant: MOTOROLA SOLUTIONS, INC., Chicago, IL (US)

(72) Inventors: Madhusudan K. Pai, Frisco, TX (US); Harisha M. Negalaguli, Princeton, TX (US); Debabrata Dash, Allen, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 160 days.

(21) Appl. No.: 18/633,155

(22) Filed: Apr. 11, 2024

(65) Prior Publication Data

US 2025/0324250 A1 Oct. 16, 2025

(51) Int. Cl.
| | |
|---|---|
| *H04L 9/40* | (2022.01) |
| *H04W 12/0433* | (2021.01) |
| *H04W 12/06* | (2021.01) |

(52) U.S. Cl.
CPC ......... *H04W 12/06* (2013.01); *H04L 63/0807* (2013.01); *H04W 12/0433* (2021.01)

(58) Field of Classification Search
CPC .............. H04W 12/06; H04L 63/0281; H04L 63/0807; H04L 63/0876; H04L 63/0884; H04L 9/3213; H04L 2209/76
See application file for complete search history.

(56) References Cited

U.S. PATENT DOCUMENTS

| | | | | |
|---|---|---|---|---|
| 6,049,821 | A * | 4/2000 | Theriault | ............ H04L 63/0236 |
| | | | | 707/E17.121 |
| 7,421,735 | B2 * | 9/2008 | Kerstens | ................. H04L 63/08 |
| | | | | 713/168 |
| 8,020,197 | B2 | 9/2011 | Shiran et al. | |
| 8,413,221 | B2 | 4/2013 | Kaliski, Jr. et al. | |
| 9,491,175 | B2 | 11/2016 | Oberheide et al. | |
| 9,948,648 | B1 * | 4/2018 | King-Britton | ...... H04L 63/0281 |
| 10,764,286 | B2 | 9/2020 | Oberheide et al. | |

(Continued)

FOREIGN PATENT DOCUMENTS

| | | |
|---|---|---|
| CN | 110999213 A | 4/2020 |
| EP | 3138257 B1 | 10/2019 |

(Continued)

*Primary Examiner* — Eric W Shepperd
(74) *Attorney, Agent, or Firm* — PERRY + CURRIER INC.

(57) ABSTRACT

A device, system and method for providing services between a communication device and an application server is provided. A trust session is established between a gateway device and an application server. The gateway device provides, to the application server, on behalf of a communication device served by the gateway device: a service request that requests a service from the application server; an indication of successful authentication of the gateway device by the application server, the indication associated with the trust session; and a payload including an indicator of the communication device. The gateway device receives, from the application server, a verification of the service request determined using at least the indication associated with the trust session. The service is provided between the communication device and the application server via one or more of the gateway device and a network.

18 Claims, 4 Drawing Sheets

(56)     References Cited

U.S. PATENT DOCUMENTS

| | | | | |
|---|---|---|---|---|
| 11,218,462 B2 * | 1/2022 | Anantha | ............... | H04W 16/14 |
| 11,477,188 B2 | 10/2022 | Duchastel | | |
| 2009/0210712 A1 * | 8/2009 | Fort | .................... | H04L 63/1441 |
| | | | | 713/175 |
| 2013/0133058 A1 * | 5/2013 | Hayes | .................... | H04L 63/08 |
| | | | | 726/12 |
| 2013/0246528 A1 * | 9/2013 | Ogura | ................... | H04L 67/563 |
| | | | | 709/204 |
| 2015/0319174 A1 * | 11/2015 | Hayton | ............... | H04L 63/0884 |
| | | | | 726/7 |
| 2015/0365412 A1 | 12/2015 | Innes et al. | | |
| 2017/0026374 A1 | 1/2017 | Oberheide et al. | | |
| 2017/0126623 A1 * | 5/2017 | Lindteigen | .......... | H04L 63/1441 |
| 2018/0152974 A1 * | 5/2018 | Chitrapu | ............. | H04W 12/033 |
| 2020/0287726 A1 * | 9/2020 | Garnier | ................... | H04L 67/12 |

| | | | | |
|---|---|---|---|---|
| 2021/0377051 A1 * | 12/2021 | Pai | ......................... | H04L 9/0825 |
| 2021/0385191 A1 * | 12/2021 | Ferguson | .............. | H04L 63/126 |
| 2022/0322090 A1 | 10/2022 | Gorai et al. | | |
| 2023/0176753 A1 * | 6/2023 | Yang | ..................... | G06F 3/0622 |
| | | | | 711/164 |
| 2023/0254288 A1 | 8/2023 | Nair | | |
| 2023/0259934 A1 * | 8/2023 | van Kooten | ............. | G06N 5/01 |
| 2023/0328815 A1 * | 10/2023 | Wiese | ..................... | H04L 12/66 |
| | | | | 370/328 |
| 2023/0336991 A1 | 10/2023 | Gorai et al. | | |

FOREIGN PATENT DOCUMENTS

| | | | |
|---|---|---|---|
| EP | 3618387 B1 | 3/2020 | |
| JP | 6224688 B2 | 11/2017 | |
| TW | 202224396 A | 6/2022 | |

* cited by examiner

DEVICE, SYSTEM, AND METHOD FOR PROVIDING SERVICES BETWEEN A COMMUNICATION DEVICE AND AN APPLICATION SERVER

BACKGROUND OF THE INVENTION

In some environments, such as first responder environments, a plurality of communication devices, such as handheld radios, may be deployed that may require communication services in broadband, for example PTT (push-to-talk) calling services, video calling services, amongst other possibilities. Such services may be provided to the communication devices via an application server, and provided at a communication device via an application client (which may be located at the communication device, or a proxy device). In such environments, a gateway device may be used to provide access to the application server by the plurality of communication devices. Such an architecture generally requires that the plurality of communication devices and/or associated application clients, be authenticated and/or authorized by the application server, for example via tokens, and subsequent token exchanges, token refresh cycles, and the like may result in hundreds of token requests (or higher), and the like, from a given communication device, or an associated application client, to the application server. This mechanism generally results in large use of processing resources and bandwidth, and furthermore does not scale well: when a system comprises tens to hundreds to thousands of communication devices, and when hundreds of token requests occur in association with one communication device, the system may fail, and/or have reduced (e.g., required) performance, due to large use of bandwidth for the token requests alone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
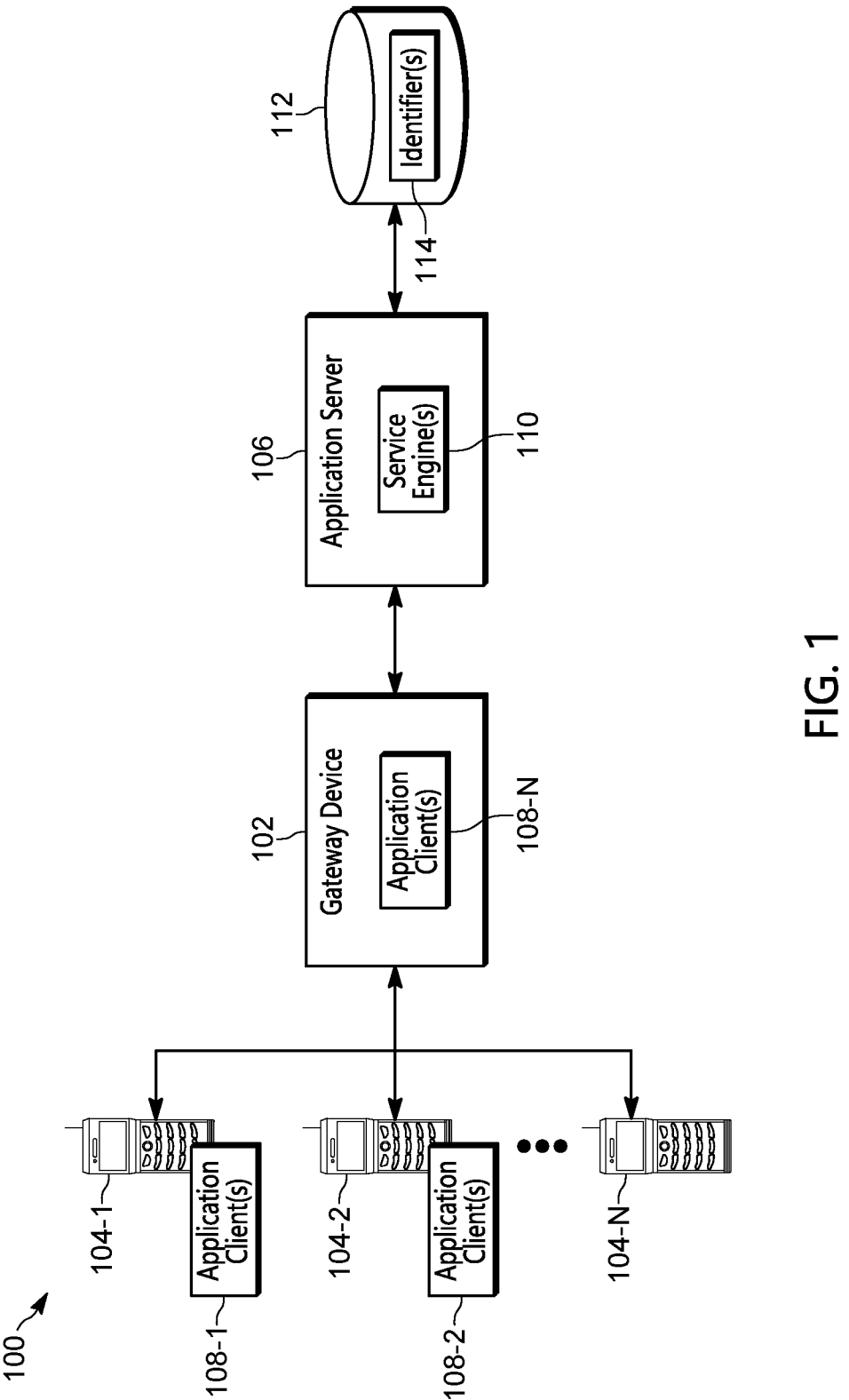
FIG. 1 is a system for providing services between a communication device and an application server, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Authorizing and/or authenticating a communication device, or an associated application client, such that the communication device, and/or an associated application client may use services provided by an application server may use large amounts of bandwidth and/or processing resources. For example, as occurs in the Open Identifier Connect (OIDC) protocol, tokens are provided that must generally be refreshed. Similar protocols, such as Kerberos, Radius, amongst other possibilities, use similar mechanisms to refresh authentication. Regardless of a type of authorization/authentication protocol used, at least the initial authorization/authentication, as well as subsequent refreshing thereof, may lead to large use bandwidth and/or processing resources. Thus, there exists a need for an improved technical method, device, and system for providing services between a communication device and an application server.

Hence, provided herein is a device, system and method for providing services between a communication device and an application server.

In particular, a system is provided that includes an application server, a gateway device and one or more communication devices. The one or more communication devices may have services associated with the application server provided via respective applications clients, which may be implemented by a particular communication device, or hosted by proxy device, such as the gateway device (which may host a plurality of applications clients on behalf of a plurality of communication devices), or another communication device (which may host a plurality of applications clients on behalf of a plurality of communication devices, as well as a respective application client).

The gateway device establishes a trust session with the application server in any suitable manner, which may include any suitable one or more authentication methods and/or any suitable one or more authorization methods, and may result in exchanging tokens and the like.

However, rather than the application server establishing a trust session with the one or more communication devices, and exchanging tokens with the one or more communications devices, the gateway device may provide, to the application server, on behalf of a communication device: a service request that requests a service from the application server; an indication of successful authentication of the gateway device by the application server, the indication associated with the trust session; and a payload including an indicator of the communication device. The payload may comprise a signed payload, for example signed using a respective private key associated with the gateway device. Furthermore, one indication and/or payload per communication device may be provided to the application server.

The gateway device may receive from the application server, a verification of the service request, and the service may be thereafter provided between the communication device and the application server (e.g., when or after the verification is received).

The application server may receive, from the gateway device, the service request, the indication associated with the trust session, and the payload, and verify the service request using: at least the indication associated with the trust session. For example, the indication of the trust session may comprise a token, and the like, issued to the gateway device by the application server during establishment of the trust session. Hence, the application server may verify the service request by receiving and verifying the token. Furthermore, when the payload comprises a signed payload, the application server may further verify the service request by verifying the payload using a public key associated with the gateway device received from the gateway device during establishment of the trust session. Hence, the application server may also verify the service request by receiving and verifying the signed payload using the public key associated with the gateway device. Furthermore, the payload includes an indicator of the communication device, that may include an identifier of the communication device, and the application server may have access to a list of identifiers of communication devices that the gateway device is eligible to represent; in these examples, application server may check the indicator of the communication device against such a list, which may again contribute to verifying the service request.

When the service request is verified, the application server may provide, to the gateway device, a verification of the service request; and grant the requested service to the communication device. The service may be provided via the gateway device and/or via a network (e.g., with, or without, the gateway device being involved).

Furthermore, such a process may occur for one or more communication devices requesting a service provided by the application server.

In this manner, the service is provided to the communication device, or the one or more communication devices, without a trust session being established (e.g., and/or tokens being exchanged) between the application server and the communication device, or the one or more communication devices. While the gateway device may periodically refresh the trust session with the application server, for example via a token refresh process, once a service request for the communication device, or the one or more communication devices, is verified, the service associated with the service request continues to be provided, presuming that the trust session is successfully refreshed, without having to again provide the service request.

An aspect of the present specification provides a method comprising: establishing, at a gateway device, a trust session with an application server; providing, from the gateway device, to the application server, on behalf of a communication device served by the gateway device: a service request that requests a service from the application server; an indication of successful authentication of the gateway device by the application server, the indication associated with the trust session; and a payload including an indicator of the communication device; receiving, at the gateway device, from the application server, a verification of the service request determined using at least the indication associated with the trust session; and providing, via one or more of the gateway device and a network, the service between the communication device and the application server.

Another aspect of the present specification provides a gateway device comprising: a communication interface; a controller; and a computer-readable storage medium having stored thereon program instructions that, when executed by the controller, cause the controller to perform a set of operations comprising: establishing a trust session with an application server; providing, to the application server, on behalf of a communication device served by the gateway device: a service request that requests a service from the application server; an indication of successful authentication of the gateway device by the application server, the indication associated with the trust session; and a payload including an indicator of the communication device; receiving, from the application server, a verification of the service request determined using at least the indication associated with the trust session, such that, the service is provided between the communication device and the application server via one or more of the communication interface and a network.

Another aspect of the present specification provides a system comprising: an application server; and a gateway device configured to: establish a trust session with the application server; provide, to the application server, on behalf of a communication device served by the gateway device: a service request that requests a service from the application server; an indication of successful authentication of the gateway device by the application server, the indication associated with the trust session; and a payload including an indicator of the communication device; receive, from the application server, a verification of the service request, wherein the service is provided between the communication device and the application server when or after the verification is received; the application server configured to: receive, from the gateway device, the service request, the indication associated with the trust session, and the payload; verify the service request using at least the indication associated with the trust session; and, in response, provide, to the gateway device, a verification of the service request; and grant the service to the communication device.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for providing services between a communication device and an application server. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a gateway device 102 that may act as a gateway, at least initially, and/or for authentication and/or for authorization, for one or more communication devices 104-1, 104-2 . . . 104-N, for example to an application server 106, via a communication network (e.g., as represented by double ended arrows between components of the system 100, as has been previously described).

As depicted, the system 100 comprises "N" number of communication devices 104-1, 104-2 . . . 104-N that are interchangeably referred to hereafter, collectively, as the communication devices 104 and, generically, as a communication device 104. This convention will be used elsewhere in the present specification. For example, the application server 106 may provide services to the communication devices 104 via respective application clients 108-1, 108-2 . . . 108-N, interchangeably referred to hereafter, collectively, as the applications clients 108 and, generically, as an application client 108.

An application client 108 associated with a respective communication device 104 may be installed at the respective communication device 104, as illustrated by the application client 108-1 being installed and/or located at the communication device 104-1.

However, in some instances, illustrated with respect to application client 108-N and a respective communication device 104-N, the gateway device 102 may act as a proxy device, implementing the application client 108-N on behalf of the respective communication device 104-N, though the services associated with the application client 108-N are nonetheless delivered to the respective communication device 104-N by the application client 108-N (e.g., via a network). For example, the respective communication device 104-N is illustrated without a respective application client 108-N located at the respective communication device 104-N.

The gateway device 102 may implement a plurality of application clients 108—on behalf of a plurality of respective communication devices 104.

Alternatively, or in addition, in some instances, illustrated with respect to the application client 108-2 and a respective communication device 104-2, the respective communication device 104-2 may act as a proxy device, implementing a respective application client 108-2, as well as other application clients 108-2 on behalf of other respective communication devices 104, though the services associated with the application clients 108-2 associated with other respective communication devices 104 are nonetheless delivered to the other respective communication devices 104 by the respective application clients 108-2 via a network. As such, the application client 108-2 is labelled in the plural.

Regardless of whether an application client 108 is implemented by a respective communication device 104, or a proxy device (e.g., the gateway device 102 and/or another communication device 104), a number "N" of the communication devices 104 and the application clients 108 may be in a one-to-one relationship.

However, in some examples, different application clients 108 may be dedicated to providing different types of services. For example, the communication device 104-1 may comprise two application clients 108-1: a PTT application client for providing PTT call services, for example to conduct PTT calls with other communication devices 104; and a video call application client for providing video call services, for example to conduct video calls with other communication devices 104. Hence, the application client 108-1 is depicted as in the plural.

Furthermore, a number "N" of the communication devices 104 and the application clients 108 may be any suitable number, and may be as low as one communication device 104 and at least one respective application client 108. However, the number "N" of the communication devices 104 and the application clients 108 may be as high as tens, hundreds, or thousands of communication devices 104 and respective application clients 108.

In a particular example, as depicted, the communication devices 104 may comprise radios operated by respective first responders. However, a communication devices 104 may comprise any suitable communication device including, but not limited to, a radio, a land mobile radio (as depicted), and the like, though the given communication device 104 may comprise other types of communication devices which may, or may not, be mobile, including, but not limited to, a cell phone, a laptop, a tablet, a personal computer, a computer terminal, and the like.

In the example, of radios for first responders, the radios may have limited functionality. For example, the first responders may need access, via the communication devices 104, to certain services of the application server 106, such as PTT call services, video call services, or any other suitable types of services that a radio may not be equipped for. Nonetheless such services may be provided via the application clients 108 delivering such services from the application server 106 to respective communication devices 104.

Furthermore, in certain instances, a number "N" of the communication devices 104 may change over time, for example increasing in the system 100 during critical incidents and/or at shift changes (e.g., of the first responders), and the like, or decreasing in the system 100 after critical incidents and/or at shift changes, and the like.

Furthermore, as depicted, the application server 106 may provide the aforementioned services via one or more respective service engines 110. For example, the one or more respective service engines 110 may comprise a PTT engine for providing PTT call services between the communication devices 104. Alternatively, or in addition, the one or more respective service engines 110 may comprise a video call engine for providing video call services between the communication devices 104.

It is furthermore understood that the aforementioned services may be delivered by the application server 106, to the respective communication devices 104, via the gateway device 102. Alternatively, or in addition, the aforementioned services may be delivered by the application server 106, to at least a portion of the respective communication devices 104 via a network, but without use of the gateway device 102. In these examples, the communication devices 104 may establish respective communication links with the application server 106 external to the gateway device 102.

However, before such services are delivered to a communication device 104, a verification of the communication device 104 generally occurs. In the prior art, tokens may be provided to the communication devices 104 by the application server 106, which must generally be refreshed, leading to large use of processing resources and bandwidth.

Hence, as will be described herein, to obviate use of tokens, and/or, more generally, to obviate refreshing verification and/or authentication of communication devices 104, and the like, a verification occurs in the system 100 for a given communication device 104 that is dependent on establishing a trust session between the gateway device 102 and the application server 106. Verification of a given communication device 104 at the application server 106 may occur via the gateway device 102 once the trust session occurs, that may include exchanging tokens and the like.

For example, rather than the application server 106 exchanging tokens with the one or more communications devices 104, the gateway device 102 may provide, to the application server 106, on behalf of a communication device: a service request that requests a service from the application server 106; an indication of successful authentication of the gateway device 102 by the application server 106, the indication associated with the trust session; and a payload including an indicator of the communication device 104. The payload may comprise a signed payload, for example signed using a respective private key associated with the gateway device 102.

As described herein, presuming the application server 106 verifies the service request, the gateway device 102 may receive from the application server 106, a verification of the service request, and the service may be thereafter provided between the communication device 104 and the application server 106 (e.g., when, or after, the verification is received).

Conversely, the application server 106 may receive, from the gateway device 102, the service request, the indication associated with the trust session, and the payload, and verify the service request using at least the indication associated with the trust session. For example, the indication of the trust session may comprise a token, and the like, issued to the gateway device 102 by the application server 106 during establishment of the trust session. Hence, the application server 106 may verify the service request by receiving and verifying the token.

Furthermore, when the payload comprises a signed payload, the application server 106 may verify the payload using a public key associated with the gateway device 102 received from the gateway device 102 during establishment of the trust session. Hence, the application server 106 may also verify the service request by receiving and verifying the signed payload using the public key associated with the gateway device 102.

Furthermore, the payload includes an indicator of the communication device 104, and the application server 106 may have access to a list of identifiers of communication devices 104 that the gateway device 102 is eligible to represent; in these examples, application server 106 may check the indicator of the communication device 104 against such a list, which may again contribute to verifying the service request.

In particular, as depicted, the application server 106 has access to a memory 112, for example, as depicted, a database, and the like, storing a list of identifiers 114 of communication devices that the gateway device 102 is eligible to represent, and the list may include respective identifiers 114 of the communication devices 104. Such identifiers 114 may include, but are not limited to, associated Media Access Control (MAC) addresses of the communication devices 104, International Mobile Equipment Identifiers (IMEIs), network identifiers of the communication devices 104, Subscriber Identity Module (SIM) numbers of the communication devices 104, a Universal Resource Identifier (URI) (e.g., such as a SIP (Session Initiation Protocol) URI and/or an Mission Critical Push To Talk (MCPTT) URI) and/or any other suitable network identifiers of the communication devices 104, and the like.

The list of identifiers 114 may be prepopulated at the memory 112, for example via a network administrator and/or when a particular communication device 104 is registered with the system 100.

Such an example illustrates that the system 100 may comprise more than one application server 106, and a given application server 106 may provide services for a subset of the communication devices 104.

Returning to the depicted application server 106, when the service request is verified, the application server 106 may provide, to the gateway device 102, a verification of the service request, and grant the requested service to the communication device 104. The service may be provided via the gateway device 102 and/or via a network (e.g., with, or without, the gateway device 102 being involved).

In this manner, a service is provided to a communication device 104, or one or more communication devices 104, without tokens being exchanged between the application server 106 and the communication device 104. While the gateway device 102 may periodically refresh the trust session, for example via a token refresh process, once a service request for the communication device 104 is verified, the service associated with the service request continues to be provided, presuming that the trust session is successfully refreshed, without having to again provide the service request.

Furthermore, such a process may occur for service requests from a plurality of the communication devices 104.

Furthermore, such a process may occur for service requests from a plurality of the communication devices 104, for a plurality of gateway devices 102. For example, while only one gateway device 102 is depicted, the system 100 may comprise a plurality of gateway devices 102, and a given gateway device 102 may act as a gateway device 102 for a subset of communication devices 104. Indeed, the list of identifiers 114 may include associations between the identifiers 114 of the communication devices 104 and respective gateway devices 102 that are eligible to represent a communication device 104 of an associated identifier 114.

The application server 106 may hence provide services to various subsets of the communication devices 104 via different gateway devices 102.

Figure 2:
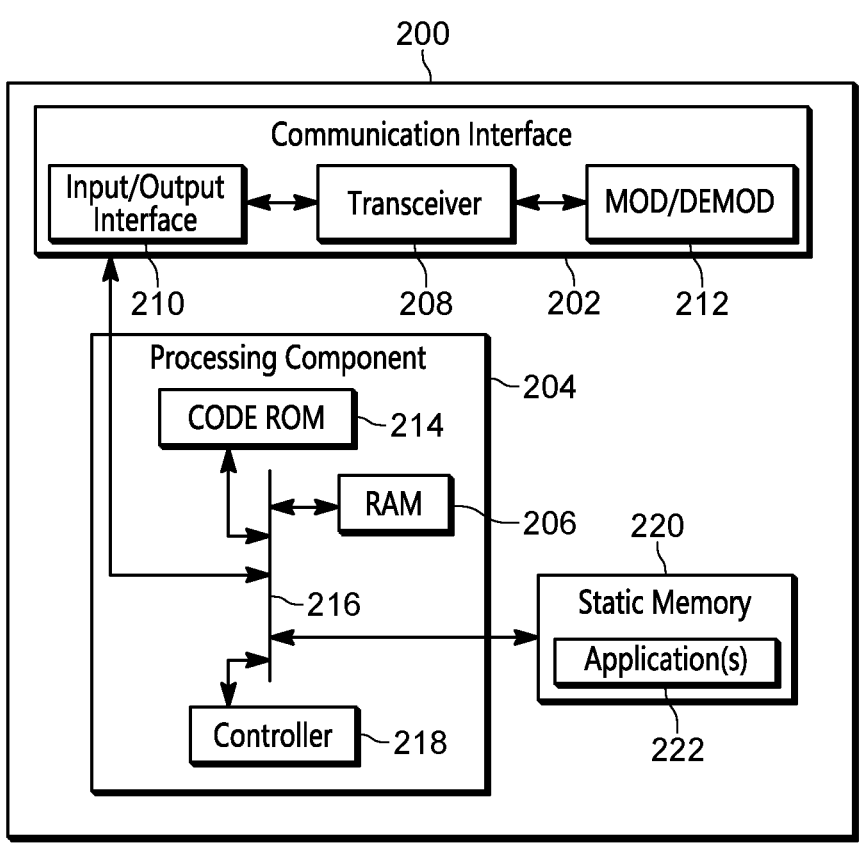
FIG. 2 is a device diagram showing a device structure of a computing device for providing services between a communication device and an application server, in accordance with some examples.

Attention is next directed to FIG. 2, which depicts a schematic block diagram of an example of an example computing device 200. The computing device 200 may represent a structure of any suitable component of the system 100, including, but not limited to, the gateway device 102, a communication device 104, or the application server 106.

While the computing device 200 is depicted in FIG. 2 as a single component, when the computing device 200 represents a structure of the gateway device 102, or the application server 106, functionality of the computing device 200 may be provided in a single component, or distributed among a plurality of components and the like including, but not limited to, any suitable combination of one or more servers, one or more cloud computing devices, and the like. Furthermore, in such examples, functionality the gateway device 102, and the application server 106 may be combined in any suitable manner.

However, when the computing device 200 represents a structure of a communication device 104, functionality of the computing device 200 may be provided in a single component.

As depicted, the computing device 200 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 200 may have any suitable structure and/or configuration.

Furthermore, when the computing device 200 represents the application server 106, a portion of the memory 220 may comprise the memory 112.

While not depicted, the computing device 200 may include, and/or be in communication with, one or more of an input component and a display screen (and/or any other suitable combination of input and/or output components) and the like. For example, when computing device 200 comprises a communication device 104, the computing device 200 may comprise a keyboard, buttons, a display screen, a microphone, and a speaker, and the like.

As shown in FIG. 2, the computing device 200 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE (Institute of Electrical and Electronics Engineers) 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G (5th generation) network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like), and hence such transceivers may be used for communications between the communication devices 104 and the gateway device 102, though, in some examples, the application server 106 may omit such transceivers.

In some examples, when the computing device 200 comprises a communication device 104 in the form of a land mobile radio, the one or more transceivers 208 may comprise one or more of a DMR transceiver, a P25 transceiver, and a TETRA transceiver, and may omit broadband transceivers (e.g., a 3GPP transceiver, an LTE transceiver, a GSM transceiver, a 5G transceiver, and the like).

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 200 is not a generic controller and/or a generic device, but a device specifically configured to implement functionality for providing services between a communication device and an application server. For example, in some examples, the computing device 200 and/or the controller 218 specifically comprises a computer executable engine configured to implement functionality for providing services between a communication device and an application server.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 200 as described herein are maintained, persistently, at the memory 220 and used by the controller 218, which makes appropriate utilization of volatile storage during the execution of such programming instructions.

Regardless, it is understood that the memory 220 stores instructions corresponding to the at least one application 222 that, when executed by the controller 218, enables the controller 218 to implement functionality particular to the computing device 200, and which may depend on a type of the computing device 200.

Figure 3:
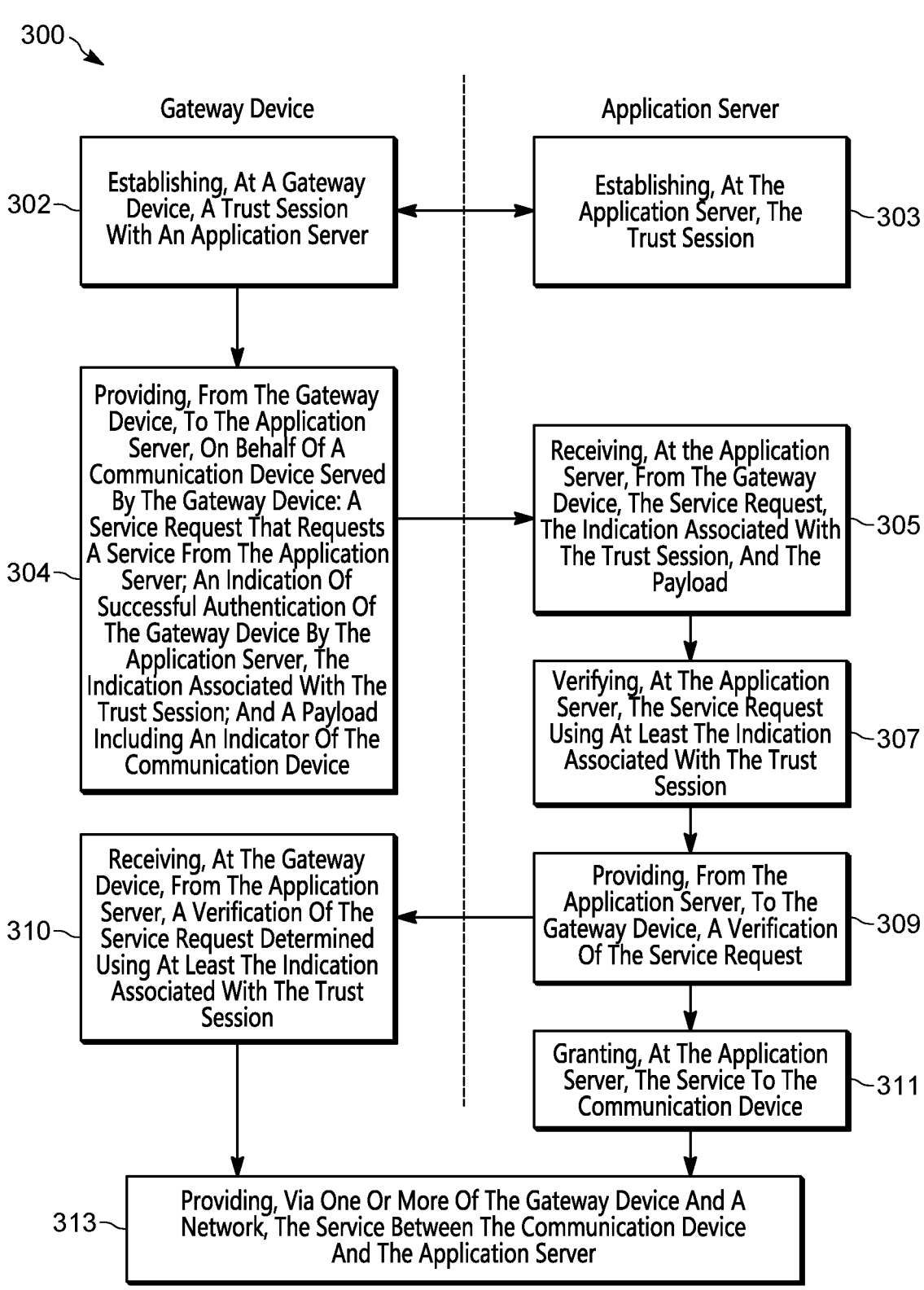
FIG. 3 is a flowchart of a method for providing services between a communication device and an application server, in accordance with some examples.

For example, when the computing device 200 represents the gateway device 102, the memory 220 stores instructions corresponding to the at least one application 222 that, when executed by the controller 218, enables the controller 218 to implement functionality, including, but not limited to, certain blocks of the method set forth in FIG. 3 implemented by the gateway device 102.

However, when the computing device 200 represents the application server 106, the memory 220 stores instructions corresponding to the at least one application 222 that, when executed by the controller 218, enables the controller 218 to implement functionality, including, but not limited to, certain blocks of the method set forth in FIG. 3 implemented by the application server 106.

Attention is now directed to FIG. 3, which depicts a flowchart representative of a method 300 for providing services between a communication device and an application server. The operations of the method 300 of FIG. 3 correspond to machine readable instructions that are executed by the gateway device 102 and the application server 106, with a broken line separating functionality implemented by the gateway device 102 and the application server 106.

The method 300 of FIG. 3 is one way that the gateway device 102 and the application server 106, and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

As described herein, certain even numbered blocks 302, 304, 310 as are understood to be implemented by the gateway device 102 and certain odd numbered blocks 303, 305, 307, 309, 311 by the application server. However, the block 313 may be implemented by a combination of the gateway device 102 and the application server 106 (e.g., via the communication interface 202), and/or by a combination of the application server 106 and a network, as described herein.

At a block 302, the gateway device 102 establishes a trust session with the application server 106 and, similarly, at the block 303, the application server 106 establishes the trust session with the gateway device 102. The blocks 302, 303 are understood to be complementary, with the gateway device 102 and the application server 106 communicating in any suitable manner to establish the trust session.

The term "trust session" as used herein is understood to include a communication session between the gateway device 102 and the application server 106 in which at least the application server 106 has authenticated the gateway device 102, though such a trust session may include the gateway device 102 having authenticated the application server 106.

For example, the gateway device 102 and the application server 106 may establish an OpenID Connect (OIDC) session, and/or any other suitable type of trust session.

Such a trust session may further include the application server 106 issuing a token, and the like, to the gateway device 102 as an indication of the trust session.

For example, when establishing the trust session, the gateway device 102 may request a token (e.g., via a token request), such as an OIDC token, from the application server 106, and provide the application server 106 with a public key (e.g., a public cryptographic key) associated with the gateway device 102, the public key being complementary to a private key (e.g., a private cryptographic key) associated with the gateway device 102.

The application server 106 may receive the request and the public key, and provide, in return to the gateway device 102, a token that may be signed by private key associated with the application server 106. As such, when the token is received later received at the application server 106 from the gateway device 102, the application server 106 may verify the token via a complementary public key associated with the application server 106.

In some examples, during the trust session, the gateway device 102 may sign communications to the application server 106 using the private key associated with the gateway device 102. As the application server 106 has been provided with the public key associated with the gateway device 102, the application server 106 may verify communications signed using the private key associated with the gateway device 102 as being from the gateway device 102 using the public key associated with the gateway device 102 received during establishment of the trust session.

In some examples, when establishing the trust session, the application server 106 may provide the gateway device 102 with a public key associated with the application server 106, the public key associated with the application server 106 being complementary to a private key associated with the application server 106. In such examples, communications from the application server 106 to the gateway device 102 may be signed using the private key associated with the application server 106, and the gateway device 102 may verify such communications as being from the application server 106 using the public key associated with application server 106 received during establishment of the trust session.

However, in other examples, when establishing the trust session, rather than exchange asymmetric keys, the application server 106 and the gateway device 102 exchange a symmetric key (e.g., via initial asymmetric key encryption) and then such a symmetric key is used to encrypt communications between the application server 106 and the gateway device 102 during the trust session. Indeed, any suitable type of encryption may occur to establish, and conduct, a trust session.

In some examples, certain functionality of the application server 106 for establishing a trust session may occur via an identity management server and/or engine (not depicted), in communication with the application server 106. In particular, a public key of a token requester may be embedded into a token itself by such an identity management server and/or engine, so that application Server is not "aware" of certain processes used in the establishing the trust session. Furthermore, in these examples, the application server 106 may be provisioned with a list of "trusted" token signers (e.g., and their respective certificates and/or public keys), such as an identifier of such an identity management server and/or engine. Furthermore, in these examples, the application server 106 may determine whether or not to trust a given token received in a trust session, by determining that the given token is signed by a token signer (and/or a trusted public key) in such a list.

While present examples of trust sessions are described with respect to tokens and cryptographic keys, any suitable process may be used to establish a trust session.

Regardless, during the trust session, the application server 106 is understood to authenticate the gateway device 102, thereby authorizing communications between the application server 106 and the gateway device 102 and/or establishing a process for authenticating communications therebetween.

At a block 304, the gateway device 102 provides, to the application server 106, on behalf of a communication device 104 served by the gateway device 102: a service request that requests a service from the application server 106; an indication of successful authentication of the gateway device 102 by the application server 106, the indication associated with the trust session; and a payload including an indicator of the communication device 104.

For example, the block 304 may be implemented by the gateway device 102 in response to receiving the service request from a given communication device 104 and/or a respective application client 108. Hence, the service request that requests the service from the application server 106, provided from the gateway device 102 to the application server 106, may comprise the service request received from the given communication device 104 and/or the respective application client 108.

The indication of successful authentication of the gateway device 102 by the application server 106 may comprise the token provided to the gateway device 102 by the application server 106 during the trust session, and the token may be signed by the private key associated with the application server 106, as has been previously described.

The payload may comprise an identifier of the communication device 104 associated with the service request, and/or an indication of communication attributes of the communication device 104 (e.g., a resolution of video supported by the communication device 104, a bandwidth supported by the communication device 104), and the like. The communication attributes of the communication device 104 may be preconfigured at the gateway device 102, for example when the communication device 104 registers with the gateway device 102, and/or the communication attributes of the communication device 104 may be received with the service request received at the gateway device 102 from the communication device 104 and/or a respective application client 108.

Furthermore, in some examples, the payload may be signed, for example using the private key associated with the gateway device 102.

At a block 305, the application server 106 receives, from the gateway device 102, the service request, the indication associated with the trust session, and the payload. Indeed, the blocks 304, 305 are understood to be complementary.

At a block 307, the application server 106 verifies the service request using at least the indication associated with the trust session. For example, the application server 106 may verify the service request using the token received with the service request using the public key associated with the application server 106 (e.g., presuming the token is signed using the complementary private key associated with the application server 106).

Furthermore, in examples where the payload is signed using the private key associated with the gateway device 102, the application server 106 may further verify the service request using the public key associated with the gateway device 102 received at the application server 106 during establishment of the trust session.

In yet further examples, the application server 106 may further verify the service request using the indication of the communication device 104, by comparing the indication in the form of an identifier of the communication device 104 against the list of identifiers 114. When the indication in the form of an identifier of the communication device 104 is on the list of identifiers 114, such a verification may occur.

In response to verifying the service request, at a block 309, the application server 106 provides, to the gateway device 102, a verification of the service request, which is received at the gateway device 102 at a block 310.

At a block 311, which may be implemented in conjunction with the block 309, the application server 106 grants the service to the communication device 104 (e.g., the communication device 104 indicated by the indicator of the payload received at the block 305). Such granting of the service may include, but is not limited to, granting of the service to the respective application client 108 of the communication device 104.

At a block 313, via one or more of the gateway device 102 and a network, the service between the communication device 104, and/or the respective application client 108, and the application server 106 is provided, for example by a given service engine 110 implemented by the application server 106 configured to provide and/or deliver the service associated with the service request. Furthermore, it is understood that the service may be provided between the communication device 104 (and/or the respective application client 108) and the application server 106 when, or after, the verification is received at the gateway device 102 at the block 310.

For clarity, herein, it is understood that, hereafter, references to a service being provided between a communication device 104 and the application server 106 may include a respective application client 108.

In some examples, the service may be provided via the gateway device 102, whereas in other examples, the service may be provided without participation of the gateway device 102. In these later examples, a communication link over a network may be established between the communication device 104 (and/or a respective application client 108) and the application server 106 and the service may be provided over the communication link. Indeed, receipt of the verification of the service request at the gateway device 102 at the block 310 may cause the gateway device 102 to communicate with the communication device 104 (and/or a respective application client 108) and the application server 106 to cause the communication device 104 (and/or a respective application client 108) and the application server 106 to establish such a communication link.

Hence, as described herein, a service is provided between a communication device 104 and the application server 106 in the absence of the application server 106 establishing a specific trust session with the communication device 104. Rather, the gateway device 102 and the application server 106 establish a trust session, and verification of service requests from different communication devices 104 may occur during this trust session. Such a process may obviate at least exchange of tokens between the application server 106 and the communication devices 104, thereby reducing use of bandwidth and processing resource in the system 100, at least compared as to when trust sessions are established between communication devices 104 and the application server 106.

It is furthermore understood that verification of service requests from the different communication devices 104 persist during the trust session and/or when tokens of the trust session are refreshed between the gateway device 102 and the application server 106.

As described herein, the method 300 may include any suitable features.

For example, the method 300 may further comprise: receiving, at the gateway device 102, from an application client 108 implemented by the communication device 104, the service request. As illustrated in FIG. 1, it is understood that the communication device 104 that initiates the service request may implement a respective application client 108, such as the communication device 104-1 implementing the respective application client 108-1.

However, in other examples, the service request may be generated by an application client 108 implemented by the gateway device 102 on behalf of the communication device 104. As illustrated in FIG. 1, it is understood that the communication device 104 that initiates the service request may implement a respective application client 108, such as the gateway device 102 implementing the respective application client 108-N on behalf of the communication device 104-N.

However, in other examples, the service request may be generated by an application client 108 associated with a given communication device 104, and such an application client 108 may be implemented by another communication device 104 on behalf of the given communication device 104.

As illustrated in FIG. 1, it is understood that a given communication device 104 that initiates the service request may implement a respective application client 108, such as the communication device 104-2 implementing a respective application client 108-2 on behalf of the given communication device 104.

Regardless of where an application client 108 is located however receipt of a service request at the gateway device 102, from a communication device 104 and/or a respective application client 108 may occur prior to the block 302.

In some examples, the method 300 may further comprise: registering, at the gateway device 102, the communication device 104, the registering occurring in an absence of the communication device 104 establishing a respective trust session with the application server 106. Such registration may occur in any suitable manner, and it is understood that such registration provides the gateway device 102 with authorization to request verification of service requests associated with registered communication devices 104 at the application server 106, for example on behalf of the registered communication devices 104. Furthermore, such registration may occur before the blocks 302, 303 and/or before the block 304.

As has been previously described, in some examples, the trust session may comprise an OpenID Connect (OIDC) session, and, in these examples, the indication associated with the trust session (e.g., provided to the application server 106 at the block 304) may comprise an OIDC token.

Furthermore, the indicator of the communication device 104, provided to the application server 106 at the block 304, may indicate one or more of: a given identifier of the communication device 104; and communication attributes of the communication device 104 (e.g., a resolution of video supported by the communication device 104, a bandwidth supported by the communication device 104, amongst other possibilities). In particular, the communication attributes may indicate to a service engine 110 that provides the service associated with the service request of settings to use when communicating with the communication device 104.

In some examples, the method 300 may further comprise: receiving, at the gateway device 102, from the application server 106, in conjunction with establishing the trust session, the indication associated with the trust session, the indication including a public key associated with the gateway device 102, the indication signed using a private key associated with the application server 106; and signing, at the gateway device 102, the payload using a respective private key associated with the gateway device 102, such that the payload comprises a signed payload.

Put another way, as has already been described, the indication may comprise the aforementioned token signed by the application server 106 using the private key associated with the application server 106, and the payload may be signed using a respective private key associated with the gateway device 102.

In further examples, the method 300 may further comprise the application server 106 verifying that the gateway device 102 is eligible to represent the communication device 104 indicated by the payload.

While such a verification may occur in any suitable manner, the method 300 may further comprise the application server 106 verifying that the gateway device 102 is eligible to represent the communication device 104 by: obtaining the indicator of the communication device 104 from the payload; and checking the indicator of the communication device 104 against the list of identifiers 114 of communication devices that the gateway device 102 is eligible to represent.

Alternatively, or in addition, the application server 106 verifying that the gateway device 102 is eligible to represent the communication device 104 indicated by the payload may occur via the gateway device 102 having access to a similar list of identifiers 114 of communication devices that the gateway device 102 is eligible to represent and providing, with the payload, an indication that the identifier of the communication device 104 is on such a list.

Figure 4:
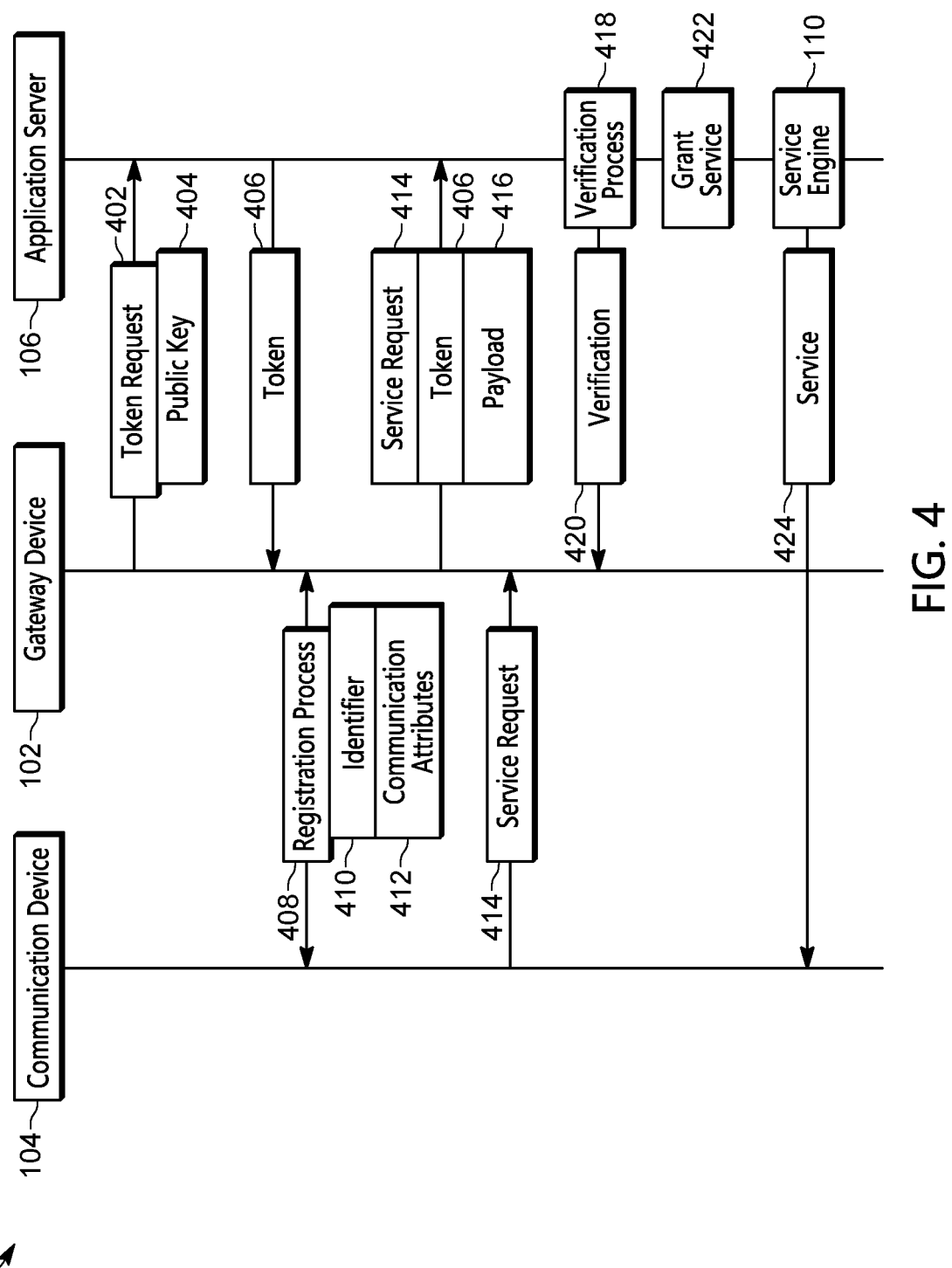
FIG. 4 depicts a signal diagram showing components of the system of FIG. 1 implementing a method for providing services between a communication device and an application server, in accordance with some examples.

Attention is next directed to FIG. 4, which depicts a signal diagram 400 showing components of the system of FIG. 1 implementing the method 300. While a communication device 104 is depicted as implementing aspects of the method 300 associated with a communication device 104, it is understood that such aspects may occur via a respective application client 108. While not all components of the system 100 are depicted in FIG. 4, they are nonetheless understood to be present. It is furthermore understood that the example of FIG. 4 is not unduly limiting and that variations of the method 300 are within the scope of the present specification.

As depicted, the gateway device 102 and the application server 106 may establish a trust session (e.g., at the blocks 302, 303 of the method 300), by the gateway device 102 providing a token request 402 to the application server 106 with a public key 404 associated with the gateway device 102. The application server 106 may, in response to receiving the token request 402 and the public key 404 associated with the gateway device 102, provide a token 406 to the gateway device 102 in response. While not depicted, the token 406 may be signed using a private key associated with the application server 106. While also not depicted, the token 406 may be provided to the gateway device 102 with a public key associated with the gateway device 102.

Alternatively, or in addition, the gateway device 102 may provide the token request 402 to the aforementioned identify management server and/or engine, and the aforementioned identify management server and/or engine may provide the token 406 to the gateway device 102.

It is understood that at least upon receipt of the token 406 at the gateway device 102, the trust session is established between the gateway device 102 and the application server 106, and that communications from the gateway device 102 to the application server 106 in the trust session may be provided with the token 406.

As also depicted in the signal diagram 400, the depicted communication device 104 registers with the gateway device 102 in a registration process 408, which occurs in any suitable manner. Such a registration process 408 may include the gateway device 102 verifying the communication device 104 in any suitable manner, for example using certificates and the like. As depicted, the registration process 408 may include registering an identifier 410 and communication attributes 412 of the communication device 104 with the gateway device 102.

While the registration process 408 is depicted as occurring after the establishment of the trust session, it is understood that the registration process 408 may occur before, during, or after the establishment of the trust session.

After the establishment of the trust session, and the registration process 408, the communication device 104 provides a service request 414 to the gateway device 102. The service request 414 may be provided when a respective application client 108 is processed and/or launched via the communication device 104, and/or at any suitable time. Furthermore, the service request 414 may be for a specific service provided by the application server 106 via a respective service engine 110.

The gateway device 102, in response to receiving the service request 414, provides (e.g., at the block 304 of the method 300), to the application server 106, the service request 414, the token 406 (e.g., an indication of successful authentication of the gateway device 102 by the application server 106), and a payload 416, which, while not depicted, may comprise the identifier 410 and the communication attributes 412 of the communication device 104. As has been previously described, the payload 416 may be signed by the private key associated with the gateway device 102.

The application server 106 receives (e.g., at the block 305 of the method 300) the token 406, the service request 414 and the payload 416, and verifies (e.g., at the block 307 of the method 300) the service request 414 using at least the token 406 (e.g., as the token is signed by the private key associated with the application server 106; and/or the token may be signed by a private key of an identity management server and/or engine, and the application server 106 may verify the service request 414 using the token 406 by determining that given token 406 is signed by a token signer such as the aforementioned identity management server and/or engine) in a verification process 418. When the payload 416 is signed by the private key associated with the gateway device 102, the application server 106 may verify the payload 416 using the public key 404 associated with the gateway device 102.

As depicted, and presuming the verification process 418 is successful, the application server 106 provides (e.g., at the block 309 of the method 300) a verification 420 of the service request to the gateway device 102, and the verification 420 is received (e.g., at the block 310 of the method 300) at the gateway device 102. The application server 106 further grants 422 (e.g., at the block 311 of the method 300) the service associated with service request to the communication device 104.

The service 424 associated with the service request may be provided (e.g., at the block 313 of the method 300) to the communication device 104 via a service engine 110 implemented by the application server 106.

It is further understood that the service 424 may be provided via the gateway device 102, and the verification 420 received at the gateway device 102 may cause the gateway device 102 to act as a gateway for communications between the communication device 104 and the service engine 110. Alternatively, the verification 420 received at the gateway device 102 may cause the gateway device 102 to communicate with the communication device 104 and the service engine 110 and/or the application server 106 to cause and/or control the communication device 104 and the service engine 110 and/or the application server 106 to establish a respective communication link therebetween, such that the service 424 is provided via the communication link (e.g., and excluding the gateway device 102).

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, establish trust sessions, issue tokens, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element.

Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM (Compact Disc-Read Only Memory), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
establishing, at a gateway device, a trust session with an application server;
registering a communication device, the registering occurring in an absence of the communication device establishing a respective trust session with the application server, the registering occurring such that the communication device does not exchange a token and does not exchange a cryptographic key with the application server, either directly or via the gateway device;
providing, from the gateway device, to the application server, on behalf of the communication device served by the gateway device:
a service request that requests a service from the application server;
an indication of successful authentication of the gateway device by the application server, the indication associated with the trust session; and
a payload including an indicator of the communication device;
receiving, at the gateway device, from the application server, a verification of the service request determined using at least the indication associated with the trust session; and
providing, via one or more of the gateway device and a network, the service between the communication device and the application server.

2. The method of claim 1, further comprising:
receiving, at the gateway device, from an application client implemented by the communication device, the service request.

3. The method of claim 1, wherein the service request is generated by an application client implemented by the gateway device on behalf of the communication device.

4. The method of claim 1, where the trust session comprises an OpenID Connect (OIDC) session and the indication associated with the trust session comprises an OIDC token.

5. The method of claim 1, where the indicator of the communication device indicates one or more of: a given identifier of the communication device; and communication attributes of the communication device.

6. The method of claim 1, further comprising:
receiving, at the gateway device, from the application server, in conjunction with establishing the trust session, the indication associated with the trust session, the indication including a public key associated with the gateway device, the indication signed using a private key associated with the application server; and
signing, at the gateway device, the payload using a respective private key associated with the gateway device, such that the payload comprises a signed payload.

7. A gateway device comprising:
a communication interface;
a controller; and
a non-transitory computer-readable storage medium having stored thereon program instructions that, when executed by the controller, cause the controller to perform a set of operations comprising:
establishing a trust session with an application server;
registering a communication device, the registering occurring in an absence of the communication device establishing a respective trust session with the application server, the registering occurring such that the communication device does not exchange a token and does not exchange a cryptographic key with the application server, either directly or via the gateway device;
providing, to the application server, on behalf of the communication device served by the gateway device:
a service request that requests a service from the application server;
an indication of successful authentication of the gateway device by the application server, the indication associated with the trust session; and
a payload including an indicator of the communication device;
receiving, from the application server, a verification of the service request determined using at least the indication associated with the trust session, such that, the service is provided between the communication device and the application server via one or more of the communication interface and a network.

8. The gateway device of claim 7, where the set of operations further comprise:
receiving from an application client implemented by the communication device, the service request.

9. The gateway device of claim 7, wherein the service request is generated by an application client implemented by the gateway device on behalf of the communication device.

10. The gateway device of claim 7, where the trust session comprises an OpenID Connect (OIDC) session and the indication associated with the trust session comprises an OIDC token.

11. The gateway device of claim 7, where the indicator of the communication device indicates one or more of: a given identifier of the communication device; and communication attributes of the communication device.

12. The gateway device of claim 7, where the set of operations further comprise:

receiving from the application server, in conjunction with establishing the trust session, the indication associated with the trust session, the indication including a public key associated with the gateway device, the indication signed using a private key associated with the application server; and signing the payload using a respective private key associated with the gateway device, such that the payload comprises a signed payload.

13. The gateway device of claim 7, wherein the set of operations further comprise:

providing the service between the communication device and the application server via the communication interface.

14. The gateway device of claim 7, wherein the set of operations further comprise:

communicating with the communication device, or a respective application client, and the application server to cause the communication device, or the respective application client, and the application server, to establish such a communication link therebetween to provide the service.

15. A system comprising:

an application server; and a gateway device comprising a hardware processor configured to:

establish a trust session with the application server;

register a communication device, the registering occurring in an absence of the communication device establishing a respective trust session with the application server, the registering occurring such that the communication device does not exchange a token and does not exchange a cryptographic key with the application server, either directly or via the gateway device;

provide, to the application server, on behalf of the communication device served by the gateway device:

a service request that requests a service from the application server;

an indication of successful authentication of the gateway device by the application server, the indication associated with the trust session; and a payload including an indicator of the communication device;

receive, from the application server, a verification of the service request, wherein the service is provided between the communication device and the application server when or after the verification is received;

the application server configured to:

receive, from the gateway device, the service request, the indication associated with the trust session, and the payload;

verify the service request using at least the indication associated with the trust session; and, in response, provide, to the gateway device, a verification of the service request; and grant the service to the communication device.

16. The system of claim 15, wherein the application server is further configured to:

verify that the gateway device is eligible to represent the communication device.

17. The system of claim 15, wherein the application server is further configured to verify that the gateway device is eligible to represent the communication device:

obtaining the indicator of the communication device from the payload; and checking the indicator of the communication device against a list of identifiers of communication devices that the gateway device is eligible to represent.

18. The system of claim 15, wherein the service is provided between the communication device and the application server via one or more of the gateway device and a network.

\*    \*    \*    \*    \*